US012602464B2

(12) United States Patent
Picard et al.

(10) Patent No.: US 12,602,464 B2
(45) Date of Patent: Apr. 14, 2026

(54) PERIPHERAL DEVICE SANDBOX

(71) Applicant: DataLocker Inc., Overland Park, KS (US)

(72) Inventors: Nicolas Picard, Gatineau (CA); Anders Kjellander, Hassleholm (SE)

(73) Assignee: DataLocker Inc., Overland Park, KS (US)

( * ) Notice: Subject to any disclaimer, the term of this patent is extended or adjusted under 35 U.S.C. 154(b) by 16 days.

(21) Appl. No.: 18/772,926

(22) Filed: Jul. 15, 2024

(65) Prior Publication Data

US 2025/0021638 A1     Jan. 16, 2025

Related U.S. Application Data

(60) Provisional application No. 63/513,580, filed on Jul. 14, 2023.

(51) Int. Cl.
*G06F 21/44* (2013.01)
*G06F 21/53* (2013.01)

(52) U.S. Cl.
CPC .............. *G06F 21/44* (2013.01); *G06F 21/53* (2013.01)

(58) Field of Classification Search
CPC ................................. G06F 21/44; G06F 21/53
USPC ......................................................... 726/30
See application file for complete search history.

(56) References Cited

U.S. PATENT DOCUMENTS

| | | | | |
|---|---|---|---|---|
| 8,763,097 B2 * | 6/2014 | Bhatnagar | ............. | H04L 63/083 |
| | | | | 713/168 |
| 2012/0047368 A1 * | 2/2012 | Chinn | ..................... | G06F 21/57 |
| | | | | 726/19 |
| 2014/0241523 A1 * | 8/2014 | Kobres | ................... | G06F 21/71 |
| | | | | 380/28 |
| 2015/0033305 A1 * | 1/2015 | Shear | .................. | G06F 21/6245 |
| | | | | 726/11 |
| 2016/0188801 A1 * | 6/2016 | Tse | .......................... | G16H 10/60 |
| | | | | 705/51 |
| 2016/0203311 A1 * | 7/2016 | Kaines | .................... | G06F 21/73 |
| | | | | 726/19 |
| 2020/0364716 A1 * | 11/2020 | Pickering | ............... | G06V 40/10 |

(Continued)

OTHER PUBLICATIONS

Loe, Edwin Lupito et al., SandUSB: An Installation-Free Sandbox for USB Peripherals, National Taiwan University of Science and Technology, Taiwan, 6 pages, 2016.

*Primary Examiner* — Teshome Hailu
(74) *Attorney, Agent, or Firm* — Hovey Williams LLP; Kameron D. Kelly

(57)     ABSTRACT

A method for authorizing a peripheral device to be operably connected to a host device. The method includes receiving an indication that the peripheral device has been physically connected with the host device. An additional step includes generating a sandbox environment within the host device. An additional step includes obtaining enumeration data from the peripheral device and obtaining a device signature identifying the peripheral device. An additional step including comparing the device signature with authorization data to determine if the peripheral device is authorized to operably connect with the host device. A further step includes, if authorized, allowing the peripheral device to operably connect with the host device, or if not authorized, denying the peripheral device to operably connect with the host device.

18 Claims, 6 Drawing Sheets

(56)          References Cited

U.S. PATENT DOCUMENTS

| | | | | |
|---|---|---|---|---|
| 2022/0201009 A1* | 6/2022 | Dhoble | .................. | H04L 67/34 |
| 2023/0177192 A1* | 6/2023 | Magen | ................... | G06F 21/53 |
| | | | | 726/28 |

* cited by examiner

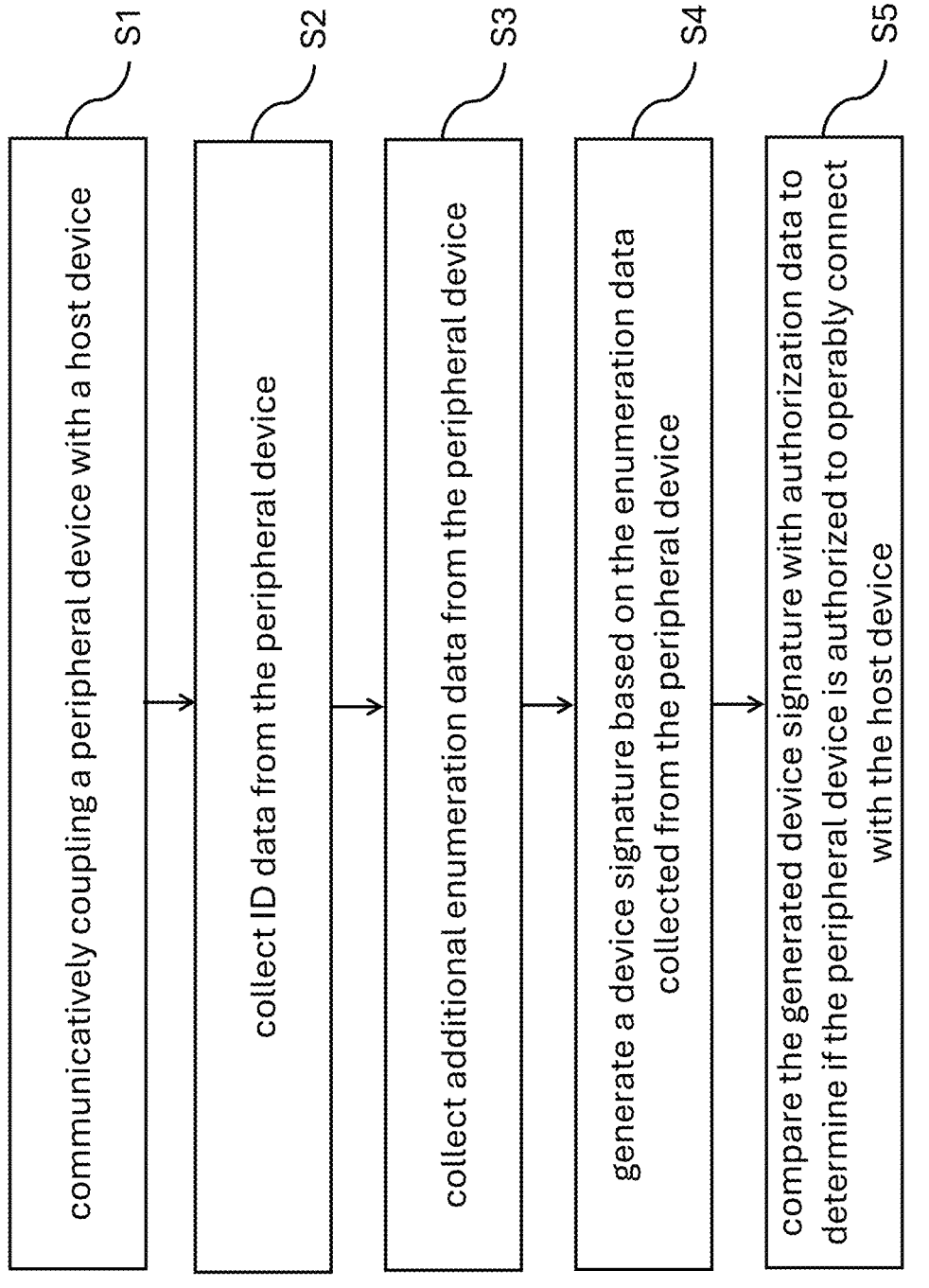

communicatively coupling a peripheral device with a host device — S1 collect ID data from the peripheral device — S2 collect additional enumeration data from the peripheral device — S3 generate a device signature based on the enumeration data collected from the peripheral device — S4 compare the generated device signature with authorization data to determine if the peripheral device is authorized to operably connect with the host device — S5

FIG. 6

PERIPHERAL DEVICE SANDBOX

CROSS-REFERENCE TO RELATED APPLICATION

The present non-provisional patent application claims priority benefit to U.S. Provisional Patent Application Ser. No. 63/513,580, filed on Jul. 14, 2023, and entitled "USB SANDBOX." The entirety of the above-identified provisional patent application is hereby incorporated by reference into the present non-provisional patent application.

FIELD OF THE INVENTION

Embodiments of the present invention are directed to methods and systems for authenticating peripheral devices. More particularly, embodiments of the present invention are directed to methods and systems for authenticating peripheral devices to prevent malicious devices from being operably connected to computers and networks.

BACKGROUND OF THE INVENTION

At present, peripheral devices, such as a Universal Serial Bus (USB) device is commonly authenticated by a host device upon the USB device being physically connected to the host device. In particular, each USB device will include, or otherwise be associated with, various identification values such as a Vendor ID (VID), a Product ID (PID), and/or a Serial No. ID (SID). Upon connecting the USB device to the host device, the USB device will only have access to the host device via the host device's kernel driver. The USB device will not have access to other components of the host device (e.g., memory) or to the host device's associated network until the host device has authenticated the USB device. Such authentication has traditionally been performed by the host device using a standard authentication routine provided through the kernel driver, which authenticates the USB device's VID, PID, and/or SID. Unfortunately, many threat actors have begun to spoof VIDs, PIDs, and/or SIDs, which can allow unauthorized peripheral devices to access a host device and/or the host device's network.

SUMMARY OF THE INVENTION

In one embodiment of the present invention, there is provided a method for authorizing a peripheral device to be operably connected to a host device. The method includes receiving an indication that the peripheral device has been physically connected with the host device. An additional step includes generating a sandbox environment within the host device. The peripheral device is configured to communicate with the host device only through the sandbox environment, such that the peripheral device is not provided access to other components of the host device or to a network to which the host device is associated. An additional step includes obtaining enumeration data from the peripheral device. An additional step includes analyzing, via the sandbox environment, the peripheral device's enumeration data to obtain a device signature identifying the peripheral device. An additional step including comparing, via the sandbox environment, the device signature with authorization data to determine if the peripheral device is authorized to operably connect with the host device and/or the host device's associated network. A further step includes, if authorized, allowing the peripheral device to operably connect with the host device and/or the host device's associated network, or if not authorized, denying the peripheral device to operably connect with the host device and/or the host device's associated network.

Additional embodiments of the present invention include a non-transitory computer readable media for authorizing a peripheral device to be operably connected to a host device. When the computer readable media is processed by a processor, the processor is configured to perform a number of steps. One step includes receiving an indication that the peripheral device has been physically connected with the host device. An additional step includes generating a sandbox environment within the host device. The peripheral device is configured to communicate with the host device only through the sandbox environment, such that the peripheral device is not provided access to other components of the host device or to a network to which the host device is associated. An additional step includes obtaining enumeration data from the peripheral device. An additional step includes analyzing, via the sandbox environment, the peripheral device's enumeration data to obtain a device signature identifying the peripheral device. An additional step including comparing, via the sandbox environment, the device signature with authorization data to determine if the peripheral device is authorized to operably connect with the host device and/or the host device's associated network. A further step includes, if authorized, allowing the peripheral device to operably connect with the host device and/or the host device's associated network, or if not authorized, denying the peripheral device to operably connect with the host device and/or the host device's associated network.

Further embodiments of the present invention include a system or authorizing a peripheral device to be operably connected to a host device. The system may comprise a computer configured to perform a number of steps. One step includes receiving an indication that the peripheral device has been physically connected with the host device. An additional step includes generating a sandbox environment within the host device. The peripheral device is configured to communicate with the host device only through the sandbox environment, such that the peripheral device is not provided access to other components of the host device or to a network to which the host device is associated. An additional step includes obtaining enumeration data from the peripheral device. An additional step includes analyzing, via the sandbox environment, the peripheral device's enumeration data to obtain a device signature identifying the peripheral device. An additional step including comparing, via the sandbox environment, the device signature with authorization data to determine if the peripheral device is authorized to operably connect with the host device and/or the host device's associated network. A further step includes, if authorized, allowing the peripheral device to operably connect with the host device and/or the host device's associated network, or if not authorized, denying the peripheral device to operably connect with the host device and/or the host device's associated network.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Embodiments of the present invention are described herein with reference to the following drawing figures, wherein:

FIG. 6 is a flow chart of a method according to embodiments of the present invention for authorizing a peripheral device to be operably connected to a host device.

Figure 1:
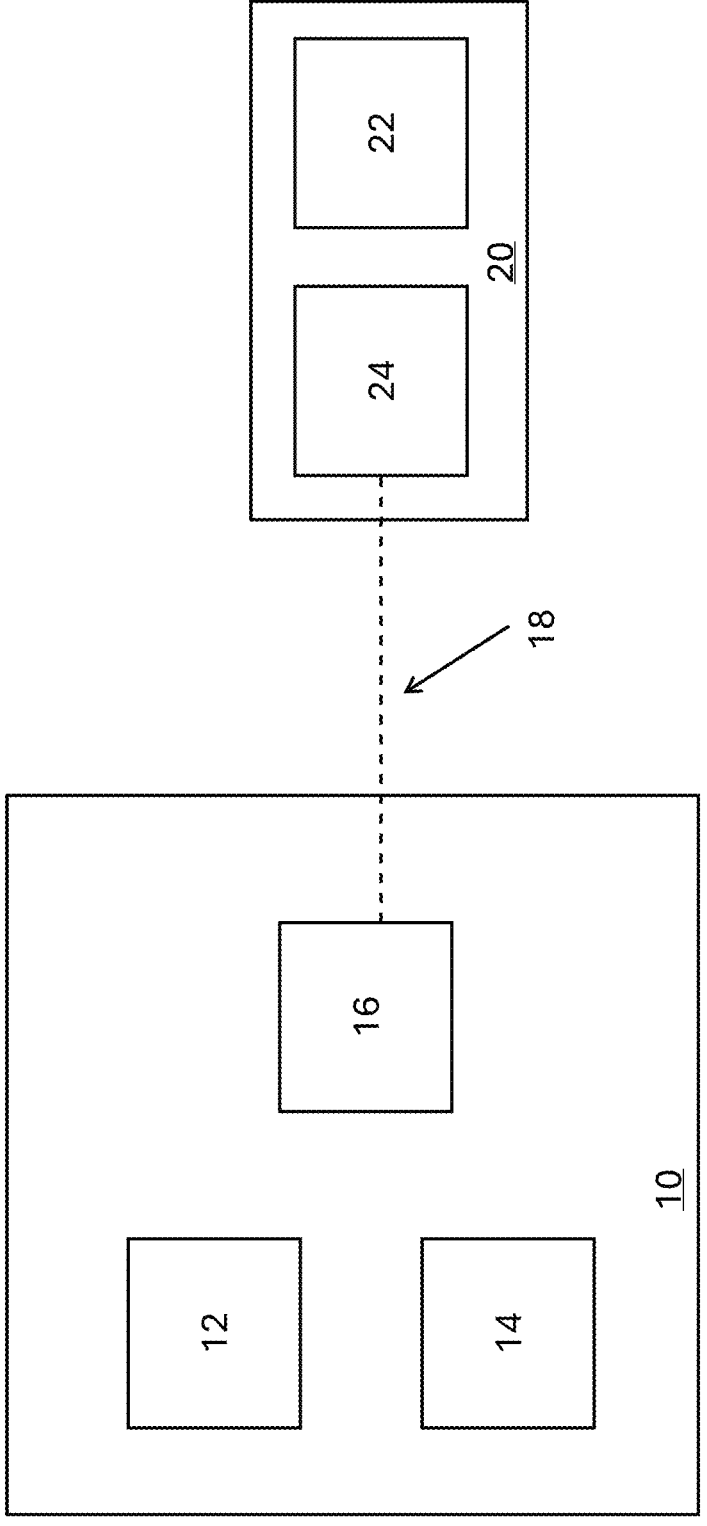
FIG. 1 is a schematic depiction of a system according to embodiments of the present invention, which is configured to authorize a peripheral device to be operably connected to a host device.

The figures are not intended to limit the present invention to the specific embodiments they depict. While the drawings do not necessarily provide exact dimensions or tolerances for the illustrated structures or components, the drawings are to scale with respect to the relationships between the components of the structures illustrated in the drawings.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly embodiments of the present invention are directed to methods, processes, systems, and/or computer-readable media with computer programs stored thereon for authorizing peripheral devices to be operable connected with host devices. With reference to FIG. 1, an exemplary system for performing the processes and/or steps described herein is schematically show. The system may include a host device 10, which may comprise generally any type of computing device with one or more processing elements 12 and/or one or more memory elements 14. Exemplary host devices 10 may include desktop computers, laptop computers, servers, tablets, smartphone, other mobile devices, and the like. The processing elements 12 may include one or more processors, microprocessors, microcontrollers, field programmable gate arrays, and the like, or combinations thereof. The memory elements may be capable of storing or retaining computer programs and may also store data, typically binary data, including text, databases, graphics, audio, video, combinations thereof, and the like. The memory elements 14 may also be known as a non-transitory "computer-readable storage medium" and may include random access memory (RAM), read only memory (ROM), flash drive memory, hard disk drives, optical storage media, and the like, or combinations thereof. In general, the memory elements 14 may be configured to store all of the applicable information described herein, which is used to carry out the various functions, methods, and/or processes of embodiments of the present invention described herein. Such functions, methods, and/or processes may be performed (at least partly) by the processing elements 12 executing the computer program stored on the memory elements 14.

In addition, the host device 10 may also include one or more communication elements 16 with which the host device 10 can send and/or receive data between peripheral devices 20 (or other computing devices) over one or more communication networks 18. The communication elements 16 may include various communication components and may be configured to operate with various functionalities including, but not limited to: one or more antennas; transmitters, receivers, and/or transceivers; a wireless radio; data ports; software interfaces and drivers; networking interfaces; data processing components; and so forth. The communication networks 18 over which the communication elements 16 may communicate include various wired and wireless networks, such as a local area network, a wide area network, an intranet, the Internet; a satellite network; a cellular network; a mobile data network; and the like. Specific examples wireless networks include, but are not limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through universal serial bus (USB), Ethernet, serial connections, and so forth. It is noted that the host device 10 may also have access to other computing devices over a separate, associated network, which may be distinct from the communications network 18 with which the host device 10 communicates with the peripheral device 20. For example, the associated network of the host device 10 may be local area network, wide area network (e.g., the Internet), etc.

Remaining with FIG. 1, the system may additionally comprise a peripheral device 20, which may include USB devices (e.g., external memory devices, keyboards, mouses, etc.); however, other peripheral devices or other general computing devices are contemplated. As illustrated in FIG. 1, the peripheral device 20 may include one or more memory elements 22 and one or more communication elements 24. Such memory elements 22 may be the same or similar as the memory elements 14 discussed above with respect to the host device 10. Similarly, the communication elements 24 may be the same or similar as the communication elements 16 discussed above with respect to the host device 10. In some embodiments, the peripheral devices 20 may include one or more processing elements, sensors, actuators, and the like. Regardless, a peripheral device 20 will be configured to communicate with a host device 10 over the communication network 18 using the respective communication elements 24, 16. As a specific example, a peripheral device 20 in the form of a Universal Serial Bus (USB) device may integrate with a host device 10 via a communication element 24 in the form of a USB connection of the peripheral device 20 physically engaging with a communication element 16 in the form of a USB port of the host device 10. However, as noted above wireless communication is also contemplated between the peripheral devices 20 and the host devices 10. In some specific embodiments, the peripheral devices 20 may comprise external USB data storage devices. However, it is contemplated that embodiments of the present invention can be used with and/or incorporate other USB devices or non-USB peripheral devices 20.

As described in the section titled Background of the Invention it has become difficult for host devices 10 to properly authenticate peripheral devices 20 based on standard identification values of the peripheral devices 20, such as Vendor Identification (VID), Product Identification (PID), and/or Serial Number Identification (SID). Embodiments of the present invention overcome such problems by providing a new manner of authenticating peripheral devices 20.

In more detail, upon connecting a peripheral device 20 to a host device 10 (e.g., physical connection, wireless connection, or the like), the peripheral device 20 will generally only have access to the host device 10 via the host device's 10 kernel driver. As is commonly known, a kernel driver is a software component (generally loaded into RAM of the host device 10) that acts as a translator between the operating system (OS) of the host device 10 and the peripheral device 20 attempting to connection with the host device 10. As such, besides the kernel driver, the peripheral device 20 will not have access to other components of the host device 10 (e.g., memory elements 14) or to the host device's 10 associated network until the host device 10 has authenticated the peripheral device 20. Such authentication has traditionally been performed by the host device 10 using a standard authentication routine provided through the kernel driver, which authenticates a VID, a PID, and/or a SID stored on the memory elements 22 of (and/or otherwise associated with) the peripheral device 20. Unfortunately, as noted previously, many threat actors have begun to spoof VIDs, PIDs, and/or SIDs, which can allow unauthorized peripheral devices 20 to access host devices 10 and/or the host device's 10 associated networks.

Embodiments of the present invention address such problems by adding additional layers of authentication before a peripheral device 20 is permitted to access a host device 10 and/or its associated networks. In more detail, upon initially validating the peripheral device's 20 VID, PID, and/or SID, the host device 10 may perform a supplemental authentication routine provided by the kernel driver. Such supplemental authentication routine may include the creation of a sandbox within which other authentication procedures may be performed. Thus, the sandbox may be created and maintained by the kernel driver of the host device 10. Alternatively, a remote system (e.g., a cloud-based service) that is in communication with the host device 10 may create and maintain the sandbox on the host device 10. Regardless, such a sandbox may comprise a virtual machine, a virtual file system, or other containerization of the host device's 10 operating system, which is separate and isolated from the rest of the host device 10 (e.g., the memory elements 14) and/or the host device's 10 associated network. As such, the supplemental authentication procedures may be performed without the risk of the peripheral device 20 gaining unauthorized access to the host device 10 and/or to the host device's 10 associated network.

With the peripheral device 20 connected only to the sandbox environment provided on the host device 10, further authentication of the peripheral device 20 can safely be performed. For example, enumeration data can be collected from the peripheral device 20. Such enumeration data may include data/message sizes (e.g., bits) and data/message transfer timing (e.g., milliseconds) characteristics of the peripheral device 20, such as the sizes and timing of data packets sent or received by the peripheral device 20 over time. Additional enumeration data may include full device descriptor messages of the peripheral device 20. The enumeration data may be collected by packet capture (PCAP) based collectors (e.g., WinPcap/NPcap for Windows-based systems or libcap for Unix-based systems) of the host device's 10 sandbox. In some embodiments, the peripheral device's 20 VID, PID, and/or SID, or combinations thereof, may also be included as part of the enumeration data. Upon collection of the enumeration data by the sandbox of the host device 10, the enumeration data may be analyzed by the host device 10 and a unique device signature or fingerprint for the peripheral device 20 may be determined or generated by the host device 10 based on such enumeration data. For example, such a device signature may include information related to the data/message size versus data/message transfer timing (e.g., bits vs. milliseconds) of data packets sent or received by the peripheral device 20. However, the device signature may include information related to generally any of the enumeration data collected form the peripheral device 20, such as VID, PID, SID, data/message sizes, data/message transfer timing, device descriptor messages, and the like. While still quarantined in the sandbox environment, the peripheral device 20 may be authenticated by the host device 10 based on the device signature.

In more detail, the supplemental authentication routine, as provided by the sandbox of the host device 10, may include comparing the device signature of the peripheral device 20 with known device signatures of approved devices or unapproved devices (e.g., malicious devices). Embodiments may provide for the host device 10 to store a database (e.g., on the memory elements 14) of known device signatures of approved/unapproved devices for comparison. Such a database may be updated periodically via remote systems in connection with the host device 10.

In additional embodiments, machine learning may be utilized by the sandbox to aid in authenticating peripheral device 20 and/or in analyzing device signatures. For example, a machine learning model may be trained using datasets of enumeration data and/or device signatures of known approved and unapproved devices. The device signature obtained from the enumeration data for the recently-connected peripheral device 20 can be processed through the machine learning algorithm for purposes of authentication. The use of such a machine learning algorithm allows for the training model to be continuously updated as additional peripheral device 20 are authenticated or not-authenticated. The training model may be stored on the host device 10 (e.g., on the memory elements 14) and/or may be updated periodically via remote systems in connection with the host device 10.

Upon authorizing the peripheral device 20 that was connected with the host device 10, the peripheral device 20 will be granted access to remaining portions of the host device 10 and/or vice versa (e.g., the host device 10 may have access to the peripheral device 20). Furthermore, the peripheral device 20 may also be provided with access to the host device's 10 associated network. In contrast, if the peripheral device 20 is not authenticated, the peripheral device 20 will be prevented from further accessing the host device 10 and/or the host device's 10 associated network. Correspondingly, the host device 10 may be prevented from accessing the peripheral device 20. In some additional embodiments, the sandbox environment of the host device 10 may provide for the contents (e.g., data files) stored on the peripheral device 20 to be scanned by the host device 10 (e.g., AV scans or content analysis) for malicious contents prior to authorizing the peripheral device 20. If malicious content is found, the peripheral device 20 may be denied access to the host device 10.

In some embodiments, after being authorized to access the host device 10 and/or the host device's 10 associated network, the peripheral device 20 may remain connected to the sandbox environment (e.g., during the entire time the peripheral device 20 is communicatively coupled with the host device 10), and the sandbox environment may continue to scan and/or filter data files, data transfers, and/or other commands sent between the peripheral device 20 and the host device 10 and/or the host device's 10 associated network. If malicious data, files, or commands are identified by the sandbox, such data, files, or commands may be filtered, quarantined, or deleted, and/or the peripheral device 20 may be restricted from further access to the host device 10 and/or the host device's 10 associated network.

Figure 2:
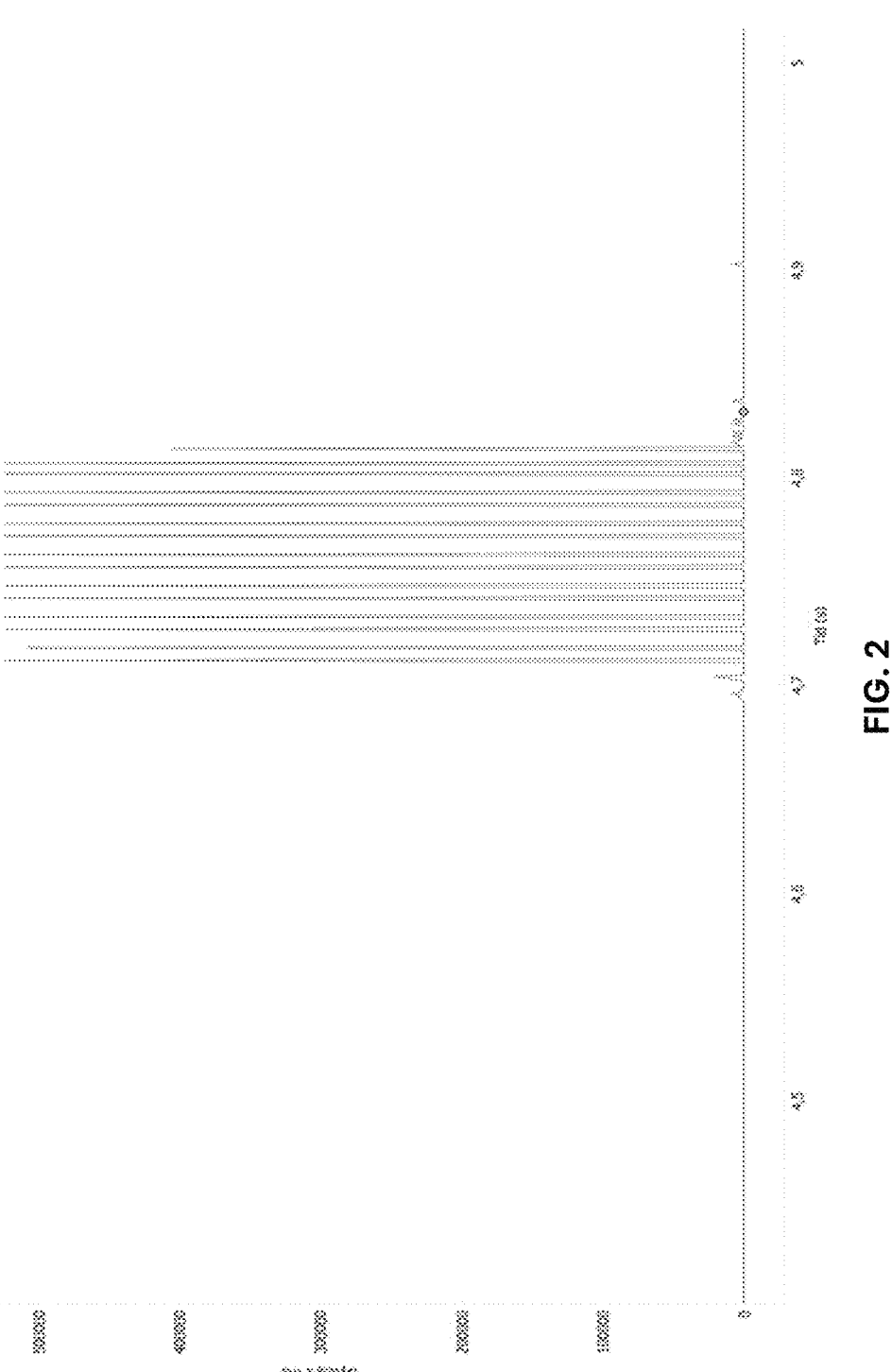
FIG. 2 is a plot of enumeration data in the form of message size vs. message timing for a first peripheral device communicating with a host device.

The following description, along with the accompanying figures, illustrate device signatures and/or enumeration data that may be used to obtain device signatures, by the sandbox of the host device 10, for peripheral devices 20. Beginning with FIG. 2, the figure illustrates a plot of message data/message size vs. data/message transfer timing for a peripheral device 20 in the form of Device A. Specifically, the y-axis shows the number of bytes per millisecond, while the x-axis show time in seconds. As can be seen from FIG. 2, Device A transmits a group of data message beginning at about 4.72 seconds and ending about 4.82 seconds. As such, the group of data messages are transmitted over a total period of about 0.1 second. The group of data messages includes about fifteen spikes, with the first spike and the third through fourteenth spikes having a data/message size of about 520 kilobytes per millisecond. In contrast, the second spike has a data/message size of about 500 kilobytes per millisecond, and the fifteenth spike has a data/message size of about 400 kilobytes per millisecond. As such, the data/message size, the data/message transfer timing, and/or the data/message size vs. data/message transfer timing of Device A (as shown in FIG. 2) may be used to generate a device signature (or may be used as the device signature) for Device A. In some other embodiments the full device descriptor, the VID, the PID, and/or the SID of Device A may also be used to generate the device signature.

Figure 3:
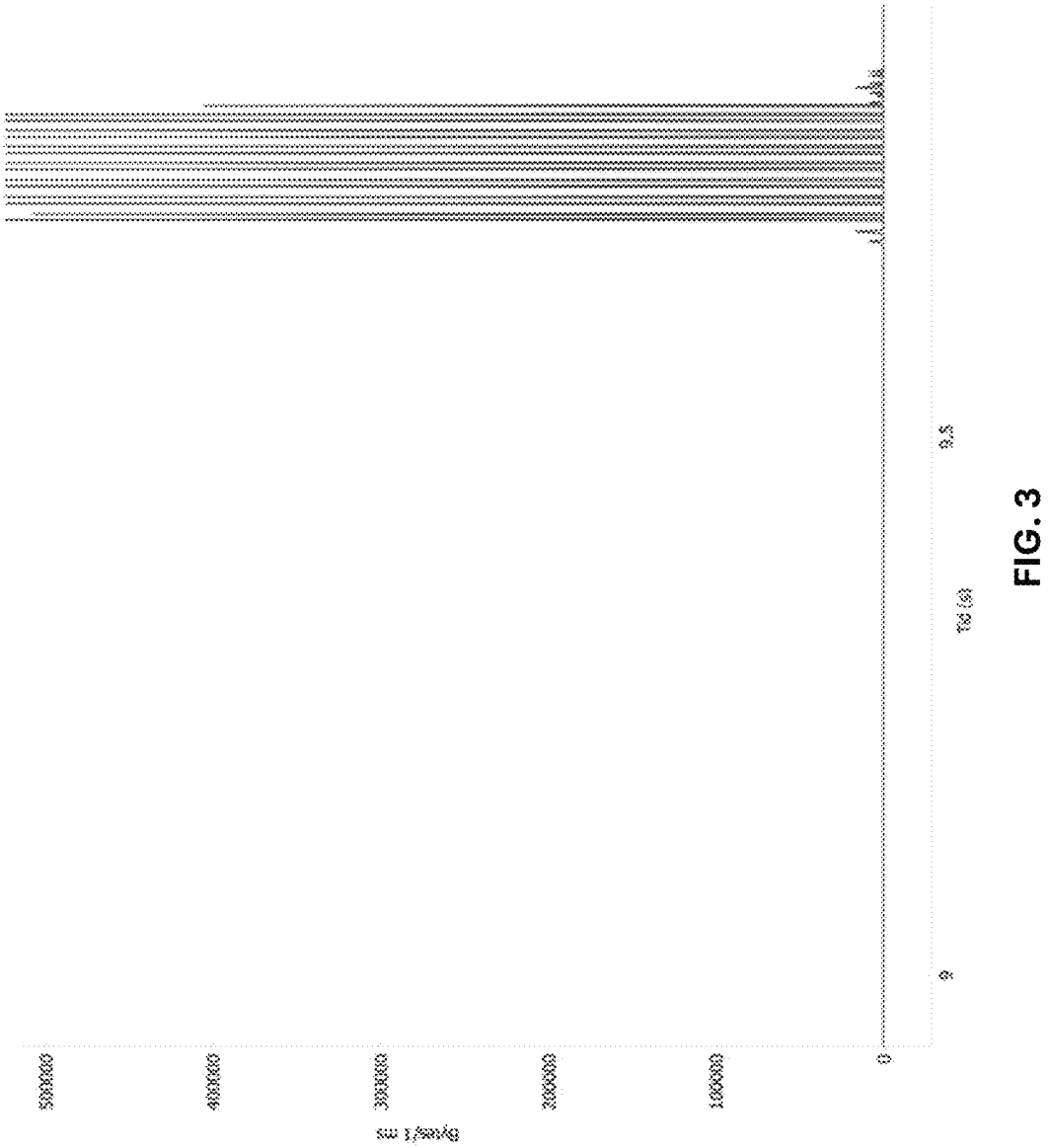
FIG. 3 is another plot of enumeration data in the form of message size vs. message timing for the first peripheral device communicating with the host device.

FIG. 3 illustrates another plot of message data/message size vs. data/message transfer timing for Device A. Although the plot shows a group of data messages occurring later in time than FIG. 2 (i.e., beginning at 9.7 seconds). The group of data messages are transmitted over a total period of about 0.1 second, which is the same as in FIG. 2. Similarly, the group of data messages have the same number spikes, each transmitting the same data/message size as the spikes from FIG. 2. Thus, a device signature based on the plot of data/message size vs. data/message transfer timing from FIG. 3 would be the same or essentially identical to the device signature based on the plot of data/message size vs. data/message transfer from FIG. 2.

Figure 4:
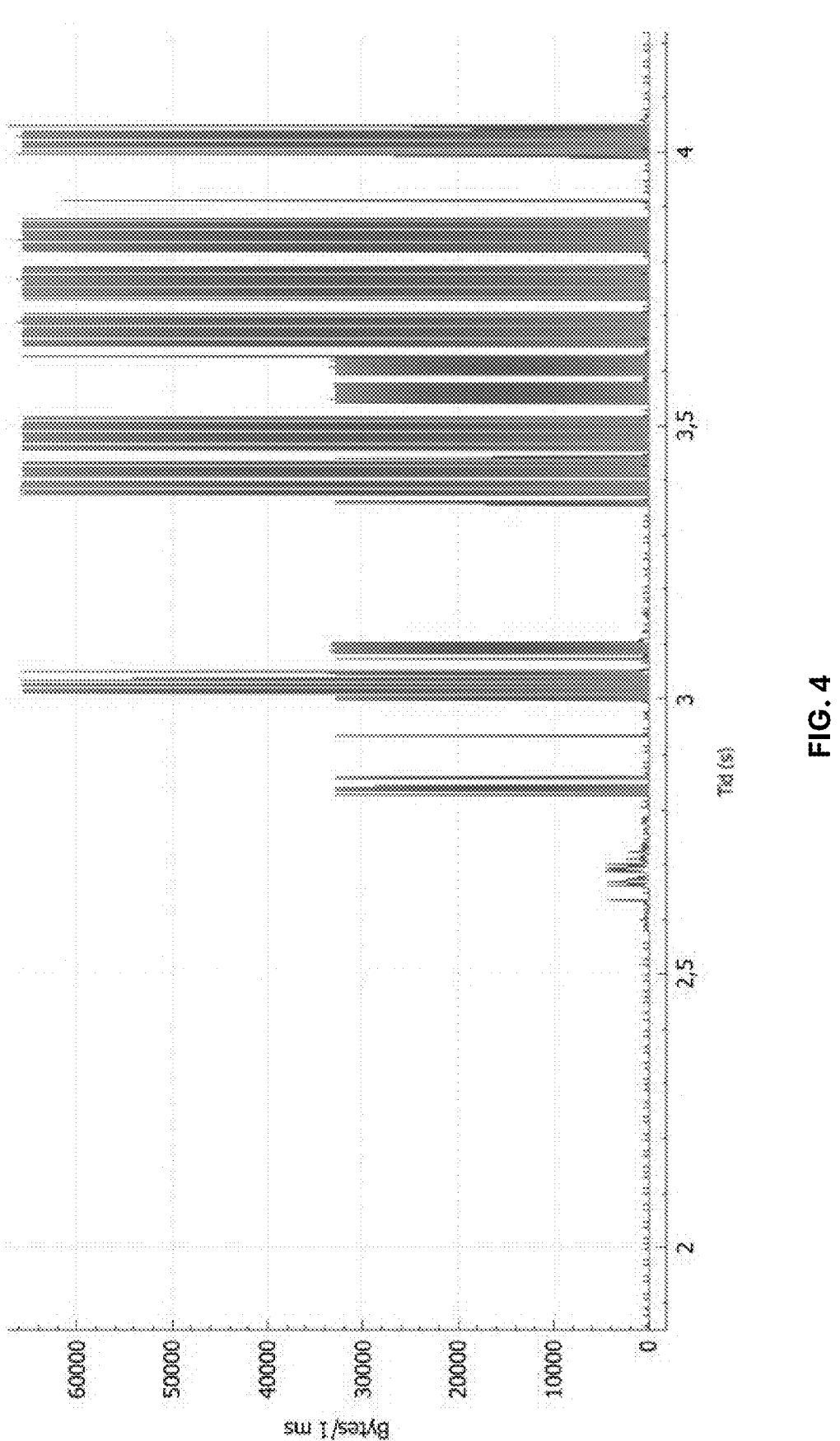
FIG. 4 is a plot of enumeration data in the form of message size vs. message timing for a second peripheral device communicating with a host device.

FIG. 4 illustrates a plot of data/message size vs. data/message transfer timing for a peripheral device 20 in the form of Device B, which is fundamentally different from the plots of Device A (shown in FIGS. 2 and 3). As can be seen from FIG. 4, Device B transmits a group of data message beginning at about 2.65 seconds and ending about 4.05 seconds. As such, the group of data messages are transmitted over a total period of about 1.4 seconds, which is significantly larger than the total time period for the group of data messages from Device A (shown in FIGS. 2 and 3). The group of data messages from Device B includes a vastly larger number of spikes, with varying data/message sizes. Most of the spikes from Device B have a data/message size of about 650 kilobytes per millisecond or about 320 kilobytes per millisecond. Thus, it is clear that the plot of data/message size vs. data/message transfer timing of Device B (shown in FIG. 4) is fundamentally different from the plot of data/message size vs. data/message transfer timing of Device A (shown in FIG. 2 or 3). As such, a device signature based on the plot of data/message size vs. data/message transfer timing from FIG. 4 would not be the same as the device signature based on the plot of data/message size vs. data/message transfer from FIGS. 2 and 3.

Figure 5:
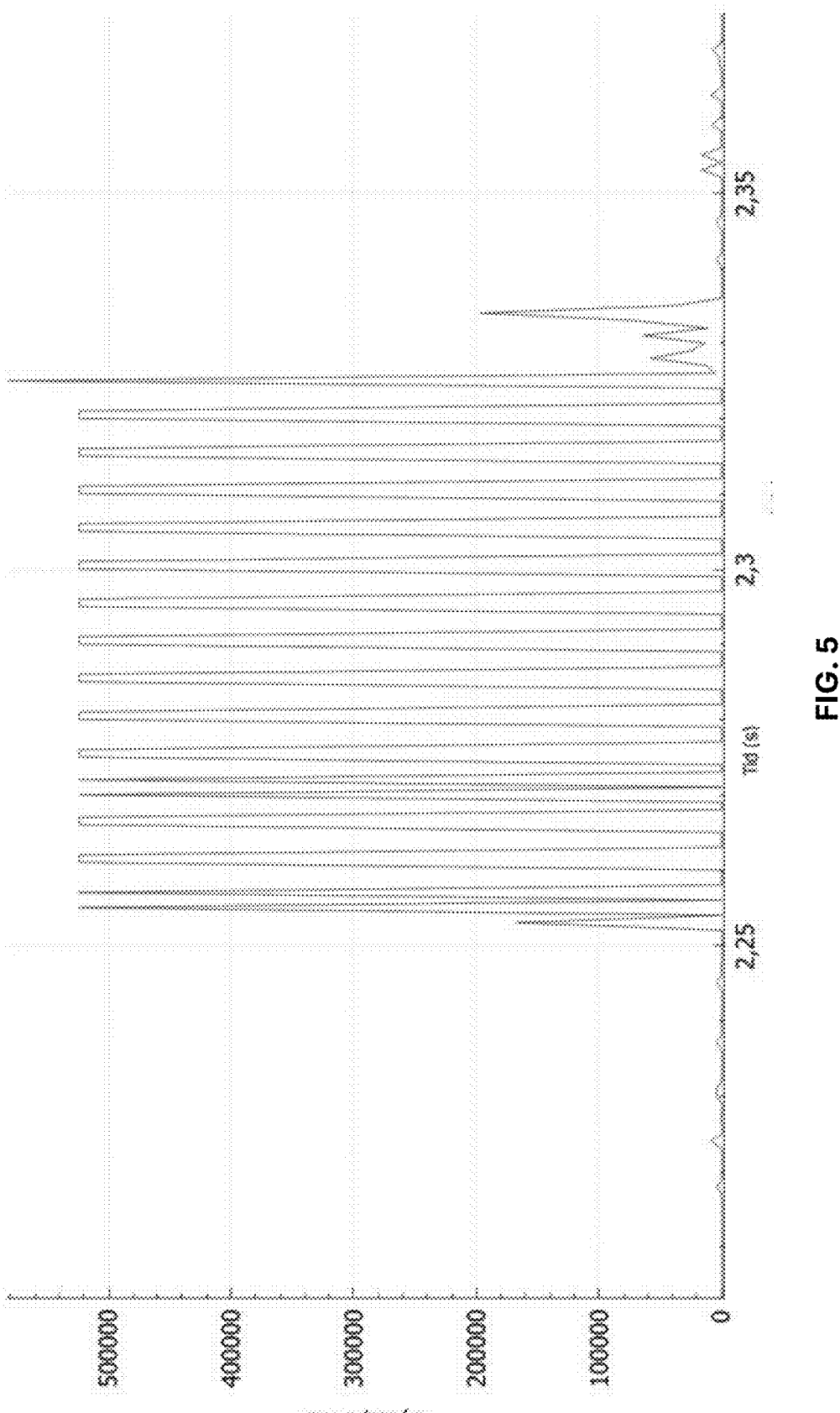
FIG. 5 is a plot of enumeration data in the form of message size vs. message timing for a third peripheral device communicating with a host device, with the third peripheral device being configured to spoof the first peripheral device from FIGS. 2 and 3.

As described above, and as will be described in more detail below, in some embodiments, device signatures may also be based, in part, on the VID, the PID, and/or the SID of the particular peripheral devices 20. Previously, such VIDs, PIDs, and/or SIDs could be spoofed by nefarious actors, such that unauthorized peripheral devices 20 could gain access to host devices 10 and/or to the host devices' 10 associated networks. FIG. 5 illustrates a plot of data/message size vs. data/message transfer timing for a peripheral device 20 in the form of Device C. Notably, Device C was a peripheral device 20 that was spoofed to match Device A, such that the VID, the PID, and the SID of Device C was manually overwritten to match the VID, the PID, and the SID of Device A. As such, if Device A was an approved peripheral device 20, and if a host device 10 only attempted to authorized the spoofed Device C based on its VID, PID, and/or SID, the spoofed Device C would likely be able to improperly gain access to the host device 10 and/or to the host device's 10 associated network.

Beneficially, however, embodiments of the present invention further use other enumeration data to authorize peripheral devices. Specifically, as is clear when comparing the plot of Device C (as shown in FIG. 5) with the plot of Device A (shown in FIGS. 2 and 3), the other enumeration data of Device C is shown to be fundamentally different from the enumeration data of Device A. Specifically, as can be seen from FIG. 5, Device C transmits a group of data message beginning at about 2.25 seconds and ending about 2.34 seconds. As such, the group of data messages are transmitted over a total period of about 0.9 seconds. Although this total transmission time period is similar to that of Device A (shown in FIGS. 2 and 3), the number of spikes and data/message sizes of Device C are significantly different from those of Device A. Specifically, the group of data messages from Device C includes a higher number of spikes, namely, about 21 spikes with varying data/message sizes. Most of the spikes from Device C have a data/message size of about 520 kilobytes per millisecond. However, the first spike from Device C is about 160 kilobytes per millisecond, which is significantly lower than the first spike from Device A. In addition, the eighteenth spike from Device C is about 580 kilobytes per millisecond, which is significantly higher than any of the spikes from Device A. Finally, the final three spike are each below 200 kilobytes per second, which is less than any of the spikes of Device A. As a result, it is clear that the plot of data/message size vs. data/message transfer timing of Device C (shown in FIG. 5) is fundamentally different from the plot of data/message size vs. data/message transfer timing of Device A (shown in FIG. 2 or 3). As such, a device signature based on the enumeration data of the plot of data/message size vs. data/message transfer timing from FIG. 5 would not be a match to the device signature of Device A based on the enumeration data of plot of data/ message size vs. data/message transfer shown in FIGS. 2 and 3. Thus, an authentication method according to embodiments of the present invention would be able to determine that Device C was an unauthorized peripheral device 20, even though the VID, the PID, and the SID of Device C match those corresponding IDs of Device A.

In addition to data/message size and data/message transfer timing. The enumeration data may also include full device descriptors for the peripheral devices 20 attempting to operably couple with a host device 10. Table 1 below illustrates full device descriptors for each of Devices A-C, as well as full device descriptors for a peripheral device 20 in the form of a generic keyboard (referred to herein as "Device D"). As discussed above, such device descriptors may be used by the sandbox of a host device 10 to determine or generate a device signature for a peripheral device attempting to operably connect with the host device 10.

TABLE 1

| Device Descriptors | Device A | Device B | Device C | Device D |
|---|---|---|---|---|
| bLength | 18 | 18 | 18 | 18 |
| bDescriptorType | 0x01 | 0x01 | 0x01 | 0x01 |
| bcdUSB | 0x0300 | 0x0200 | 0x0320 | 0x0200 |
| bDeviceClass | Device | Device | Device | Device |
| bDeviceSubClass | 0 | 0 | 0 | 0 |
| bDeviceProtocol | 0 | 0 | 0 | 0 |
| bMaxPacketSize0 | 9 | 64 | 9 | 8 |
| idVendor | Unk | KT | RSC | EMC |
| idProduct | Unk | Unk | NVME Adapter | Keyboard |
| bcdDevice | 0x0001 | 0x0110 | 0x2001 | 0x0107 |
| iManufacturer | 1 | 1 | 1 | 0 |
| iProduct | 2 | 2 | 2 | 0 |
| iSerialNumber | 3 | 3 | 3 | 0 |
| bNumConfigurations | 1 | 1 | 1 | 1 |

In view of the above, embodiments of the present invention are directed to processes for authorizing peripheral devices 20 to be in operable connection/communication with a host device 10. FIG. 6 illustrates an exemplary process according to embodiments of the present invention. Step S1 includes communicatively coupling a peripheral device 20 with a host device 10. For example, a peripheral device in the form of a USB device may be plugged into the host device 10 to facilitate a wired connection. Nevertheless, it should be understood that the peripheral device 20 may be communicatively coupled with the host device 10 in a wired manner. Regardless, once the peripheral device 20 is communicably coupled with the host device (physically or wirelessly), the host device 10 will receive an indication that the peripheral device 20 has been communicably coupled with the host device 10. For example, when a peripheral device 20 in the form of a USB device is physically plugged into the host device 10 on a USB port of the host device 10, the host device 10 will send a power signal to the USB device via the USB port to recognize that the USB device is physically plugged into the USB port.

Next, the host device 10 may collect various enumeration data to authorize the peripheral device 20. For example, as shown in Step S2, the host device 10 may collect identification (ID) data from the peripheral device 20. The ID data my include the VID, the PID, and/or the SID of the peripheral device 20. As discussed previously, the peripheral device 20 may initially only be connected to the kernel driver of the host device 10, such that the VID, the PID, and/or the SID of the peripheral device 20 may be collected by the kernel driver. If the ID data of the peripheral device does not match ID data of approved devices, then the peripheral device 20 will not be authorized to access the host device 10 (or vice versa).

If the ID data of the peripheral device matches ID data of approved devices, then the host device 10 will, in Step S3, collect various other additional enumeration data from the peripheral device 20. As discussed previously, the peripheral device 20 may initially only be connected to the sandbox of the host device 10 at this stage. The sandbox may be a virtual machine, a virtual file system, or other containerization of the host device's 10 operating system, which is separate and isolated from the rest of the host device 10. The enumeration data collected may include data/message sizes (e.g., bits), data/message transfer timing (e.g., milliseconds) of the peripheral device 20, such as the sizes and timing of data packets sent or received by the peripheral device 20 over time (as well as comparisons thereof). Additional enumeration data may include full device descriptor messages of the peripheral device 20.

Based on the enumeration data collected from the peripheral device 20, the host device 10 (perhaps through the sandbox) will, in Step S4, generate a device signature for the peripheral device 10. As noted previously, the enumeration data used to create the device signature may include, for example, data/message sizes, data/message transfer timing, the full device descriptors, etc. In some embodiments, such data may be normalized to generate the device signature. Regardless, in some specific embodiments, the device signature may comprise the data/message size versus data/message transfer timing information (e.g., bits vs. milliseconds). In some embodiments, the enumeration data may be processed through a machine learning algorithm to create the device signature.

Once the device signature of the peripheral device 20 is created, the device signature is, in Step S5, compared with authorization data to determine if the peripheral device 20 is authorized to operably connect with the host device 10 and/or the host device's 10 associated network. In some embodiments, the authorization data may comprise a set of previously authorized device signatures and previously unauthorized device signatures. Such previously authorized and unauthorized device signatures may be stored in a database, such as on the host device 10 or on a remote device in communication with the host device 10 over a communication network. In some embodiments, the database may be periodically (or in real-time) as additional peripheral devices are determined to be authorized or unauthorized.

In some additional embodiments, the comparison of the device signature with the authorization data may be at least partly performed using a machine learning algorithm. The machine learning algorithm may be executed on the host device 10 or on a remote device in communication with the host device 10 over a communications network. Regardless, the authorization data of the machine learning algorithm may be updated periodically (or in real-time) as additional peripheral devices 20 are determined to be authorized or unauthorized.

In view of the above, embodiments of the present invention relate to processes and system for advanced device endpoint security. The technology addresses the limitations of traditional port control solutions by utilizing cutting-edge machine learning algorithms and in-depth device data analysis to create unique device signatures. This approach ensures that only authorized devices gain access to a computer network, providing unparalleled protection against increasingly sophisticated threats, such as unauthorized device attacks and spoofing. The present invention's compatibility with various hardware configurations, Windows versions, and USB devices ensures seamless integration with existing infrastructure, while its adaptive machine learning capabilities allow for continuous improvement in decision-making processes and adaptation to emerging threats. The invention also facilitates effortless implementation and collaboration with other security solutions, including antivirus, data loss prevention, and logging systems.

What is claimed is:

1. A computer-implemented method for authorizing a peripheral device to be operably connected to a host device, said method comprising the following steps:

receiving an indication that the peripheral device has been physically connected with the host device;

generating a sandbox environment within the host device, wherein the peripheral device is configured to communicate with the host device only through the sandbox environment, such that the peripheral device is not provided access to other components of the host device or to a network with which the host device is associated;

obtaining enumeration data from the peripheral device;

analyzing, via the sandbox environment, the peripheral device's enumeration data to obtain a device signature identifying the peripheral device, wherein the enumeration data comprises data sizes of messages sent from the peripheral device and timing of the messages sent from the peripheral device, and wherein the device signature comprises a comparison of data sizes of messages sent from the peripheral device and timing of the messages sent from the peripheral device;

comparing, via the sandbox environment, the device signature with authorization data to determine if the peripheral device is authorized to operably connect with the host device and/or the host device's associated network; and if authorized, allowing the peripheral device to operably connect with the host device and/or the host device's associated network, or if not authorized, denying the peripheral device to operably connect with the host device and/or the host device's associated network.

2. The method of claim 1, wherein the peripheral device comprises a universal serial bus (USB) device, and wherein the USB device is physically connected to the host device via a USB port of the host device.

3. The method of claim 1, wherein the sandbox environment comprises one or more of the following: a virtual machine, a virtual file system, and a containerization of an operating system of the host device.

4. The method of claim 1, wherein the enumeration data further comprises one or more of the following: a vendor ID (VID) of the peripheral device, a product ID (PID) of the peripheral device, and a serial number ID (SID) of the peripheral device.

5. The method of claim 1, wherein the enumeration data further comprises a full device descriptor message of the peripheral device.

6. The method of claim 1, wherein the authorization data with which the device signature is compared includes a listing of authorized and unauthorized signatures.

7. The method of claim 6, wherein the listing of authorized and unauthorized signatures is stored on a database of the host device.

8. The method of claim 1, wherein the step of comparing the device signature with authorization data includes analyzing the device signature with a machine learning algorithm.

9. The method of claim 8, wherein the machine learning algorithm is updated continuously upon each authorization or denial to operably connected peripheral devices with the host device.

10. The method of claim 1, further including the step of scanning, by the sandbox environment of the host device, data files or commands passed from the peripheral device to the host device, and filtering, by the sandbox environment, any malicious data files or commands passed from the peripheral device to the host device.

11. The method of claim 1, further including the step of scanning, by the sandbox environment of the host device, data files stored on the peripheral device.

12. A non-transitory computer readable medium with a computer program stored thereon for authorizing a peripheral device to be operably connected to a host device, wherein when one or more processors of the host device execute the computer program the processors are configured to:

receive an indication that the peripheral device has been physically connected with the host device;

generate a sandbox environment within the host device, wherein the peripheral device is configured to communicate with the host device only through the sandbox environment, such that the peripheral device is not provided access to other components of the host device or to a network to which the host device is associated;

obtain enumeration data from the peripheral device;

analyze, via the sandbox environment, the peripheral device's enumeration data to obtain a device signature identifying the peripheral device, wherein the enumeration data comprises data sizes of messages sent from the peripheral device and timing of the messages sent from the peripheral device, and wherein the device signature comprises a comparison of data sizes of messages sent from the peripheral device and timing of the messages sent from the peripheral device;

compare, via the sandbox environment, the device signature with authorization data to determine if the peripheral device is authorized to operably connect with the host device and/or the host device's associated network; and if authorized, allow the peripheral device to operably connect with the host device and/or the host device's associated network, or if not authorized, deny the peripheral device to operably connect with the host device and/or the host device's associated network.

13. The non-transitory computer readable medium of claim 12, wherein the peripheral device comprises a universal serial bus (USB) device, and wherein the USB device is configured to be physically connected to the host device via a USB port of the host device.

13 14

14. The non-transitory computer readable medium of claim 12, wherein the sandbox environment comprises one or more of the following: a virtual machine, a virtual file system, and a containerization of an operating system of the host device.

15. The non-transitory computer readable medium of claim 12, wherein the enumeration data further comprises one or more of the following: a vendor ID (VID) of the peripheral device, a product ID (PID) of the peripheral device, a serial number ID (SID) of the peripheral device, data sizes of messages sent from the peripheral device, timing of messages sent from the peripheral device, and a full device descriptor message of the peripheral device.

16. The non-transitory computer readable medium of claim 12, wherein the authorization data with which the device signature is compared includes a listing of authorized and unauthorized signatures.

17. The non-transitory computer readable medium of claim 12, wherein the step of comparing the device signature with authorization data includes analyzing the device signature with a machine learning algorithm.

18. The non-transitory computer readable medium of claim 12, wherein the processor is further configured to scan, by the sandbox environment of the host device, data files or commands passed from the peripheral device to the host device, and filtering, by the sandbox environment, any malicious data files or commands passed from the peripheral device to the host device.

\* \* \* \* \*